ly adapted for oral administration in connection with X-ray investigations.

In addition to the aforesaid, it can be stated that it has not been possible to produce free-flowing X-ray contrast compositions when using barium sulfate not treated according to the invention and, for example, solid fats. Nor has it been possible to attain the same effect by the aid of barium sulfate which is merely admixed with the salt. Thus, it is considered necessary to coat the particles of the barium sulfate with a layer of the additive.

3,216,900
STABILIZED BARIUM SULPHATE X-RAY COMPOSITIONS

Paul Gunnar Embring, Uppsala, and Per Ove Mattsson, Danderyd, Sweden
No Drawing. Filed Jan. 14, 1963, Ser. No. 251,031
8 Claims. (Cl. 167—95)

The present invention concerns a composition of matter adapted to be used, after adding water thereto, in connection with the X-ray investigation of the gastro-intestinal tract. More particularly, the invention concerns a composition of matter of this type containing pulverulent barium sulfate as an X-ray contrast producing agent and each of the three nutrients liquid fat, carbohydrates, and proteins.

For the examination and investigation of the gastrointestinal tract, it is known to use as a test-meal a composition of matter mainly consisting of barium sulfate as a contrast-producing agent and each of the three main nutrients fat, proteins and carbohydrates. Such compositions have especially come in use for so-called passage examinations (vide Acta Radiologiea, November 1960, pages 334–343).

In order that such compositions may function in the intended way, giving an acceptable result of investigation, it is required, or at least desirable, that the fat component should be a fat which is, at least essentially, liquid at room temperature, i.e. an oil. Owing to the content of oil, which always amounts to at least 4% and may be as high as 12%, the compositions will be very smeary and thus difficult to handle for dosaging purposes, when a test meal is to be prepared. Moreover, a smeary and dauby test-meal composition for X-ray investigations can only be stored for a reduced period of time in a hospital.

The object of the present invention is to provide a composition of the type set forth above which, despite a content of liquid oil in the limits above specified, is free-flowing and thus more readily handable for dosaging purposes than similar compositions previously known.

It has been found, according to the invention, that the object referred to can be attained by a composition of the type referred to, in which the barium sulfate is in pulverulent form and has its particles covered with a neutral therapeutically acceptable alkali metal or ammonuim salt of citric or pyroposphoric acid. Among the alkali metal salts mention should primarily be made of the sodium- and potassium salts.

The treatment according to the invention is carried out in such a way that pulverulent barium sulfate is wetted with a solution, preferably an aqueous solution, of the appropriate salt, whereupon the mixture is subjected to drying. The practically water-free product obtained, which thus consists of fine particles of barium sulfate the surface of which is covered or impregnated with a layer of the salt set forth, is then mixed with each of the three main nutrients and, possibly, with other materials, such as flavouring or sweetening agents, salts stabilizers or diluents, to form a free-flowing, stable powder which readily lends itself to be dosaged. In this connection, it has proved that a powder treated in the intended way can be mixed, in a very satisfactory manner, with the remaining ingredients of the X-ray contrast composition.

It must be considered surprising that despite the relatively high content of oil, a composition of matter of the above type can in fact be obtained with the properties set forth. It can be mentioned that an oil-containing composition of matter containing barium sulfate which has been treated in the manner set forth above, can be transformed, very readily, into a suspension which is excellent- The content of a salt of citric or pyrophosphoric acid present in the combination of this salt with the barium sulfate, can vary between broad limits. Preferred constants are in the range of from 0.1 to 5, inclusive, percent. Still more preferred contents are in the range of from 0.5 to 2, inclusive, percent.

The proportion of barium sulfate of the X-ray contrast composition can vary between broad limits. It will usually be between 40 and 90 percent, based on the total weight of the X-ray contrast composition.

The proportion of carbohydrates can vary between 10 and 60 percent, preferably between 10 and 30 percent, based on the total weight of the X-ray contrast composition.

The proportion of proteins can vary between 5 and 30 percent, preferably between 5 and 20 percent, based on the total weight of the X-ray contrast composition.

As carbohydrates may be mentioned: glucose, saccharose, lactose, maltose, fructose, and galactose.

As proteins may be mentioned: dry milk, fish meal and meat meal.

As liquid fats may be mentioned: peanut oil, cottonseed oil, bottlenose oil, whale-oil and sun-flower oil.

In addition to the components set forth, the X-ray contrast composition according to the invention may contain other additives, such as salts, cellulose-containing materials and diluents, stabilizers and/or antioxidants and, as set forth above, flavouring or sweetening agents. Usually, these components are present only in minor amounts, and it is, therefore, possible to state that at least the main part of the X-ray contrast composition should be the contrast-producing agent and the main nutrients. In order to maintain its property of being free-flowing, the X-ray contrast composition should, of course, be wholly or at least practically free from water or similar liquids.

Suitable dosages of the new compositions of matter are in the range of from 60 to 550, inclusive, g, preferably in the range of from 60 to 350, inclusive, g.

The following examples are illustrative of preferred embodiments of the present invention.

Example 1

750 g. of pulverulent barium sulfate are treated with 10 g. of trisodium citrate dissolved in 10–12 g. of hot distilled water. The mixture is sieved and dried. To the dry product are added 200 g. of dry milk powder, containing 43 percent of carbohydrates and 57 percent of proteins, and moreover 75 g. of glucose (carbohydrate) and finally 50 g. of corn oil. The composition obtained will then be of the following composition in percent.

| Component: | Percent by weight |
|---|---|
| Barium sulfate+sodium tricitrate | 70 |
| Carbohydrates | 15 |
| Fats | 4.5 |
| Proteins | 10.5 |
| | 100 |

For the mixing operation was used a fork mixer having a rotating pot or container. The mixture obtained is caused to pass through the No. 20 sieve (according to the Swedish Pharmacopaeia) and then in the form of a fine powder which can be stored satisfactorily and portioned for a test meal in connection with an X-ray examination. 218 g. of the powder are mixed with 200 ml. of water to form a suspension having a volume of about 300 ml. and a consistency suitable for oral administration.

*Example 2*

1500 g. of pulverulent barium sulfate are treated with an aqueous solution of 25 g. of tetrapotassium pyrophosphate dissolved in about 50 ml. of distilled water. The wet mixture obtained is sieved (the No. 20 sieve according to the Swedish Pharmacopaeia) and dried carefully. To the dry mixture thus obtained are added 265 g. of glucose, 240 g. of skim milk powder, containing 43 percent of carbohydrates and 57 percent of proteins, and 135 g. of peanut oil. The mixture will be of the following composition.

| Component: | Percent by weight |
|---|---|
| Barium sulfate+potassium pyrophosphate | 72 |
| Carbohydrates | 14 |
| Proteins | 7 |
| Fats | 7 |
| | 100 |

The mixing operation is carried out with the same mixer as used in Example 1. On passing the mixture through the No. 20 sieve, the free-flowing pulverulent mixture obtained will be in a form suitable for portioning purposes.

A dosage suitable for peroral administration in connection with X-ray examinations of the gastro-intestinal tract is 220 g. On stirring this amount with 200 ml. of water, it will form a suspension suitable for peroral administration.

*Example 3*

As Example 2 with the exception that rather than 135 g. of corn oil are used 135 g. of peanut oil.

*Example 4*

As Example 2 with the exception that rather than 25 g. of potassium pyrophosphate are used 25 g. of tripotassium citrate.

*Example 5*

As Example 1 with the exception that rather than 10 g. of trisodium citrate are used 12 g. of tetrasodium pyrophosphate.

Those skilled in the chemical art and particularly in the art to which this invention pertains, will readily appreciate that many modifications of the basic invention set forth here are possible. All such obvious modifications would not avoid infringement under the well known "doctrine of equivalents."

What is claimed is:

1. A pulverulent free-flowing composition practically free of water and comprising in combination:
    (a) a nutrient component consisting of a combination of liquid fat, protein and carbohydrates, and,
    (b) pulverulent barium sulfate,
    (c) the particles of said barium sulfate being coated with a neutral therapeutically acceptable salt,
    (d) said salt being selected from the group consisting of alkali metal citrates, ammonium citrates, alkali metal pyrophosphates, and ammonium pyrophosphates,
    (e) the amount of said salt being within the range of 0.5–2% based on the weight of the barium sulfate.

2. A pulverulent free-flowing composition practically free of water and comprising in combination:
    (a) a nutrient component consisting of a combination of liquid fat, protein and carbohydrates, and;
    (b) pulverulent barium sulfate,
    (c) the particles of said barium sulfate being coated with a neutral therapeutically acceptable salt,
    (d) said salt being selected from the group consisting of alkali metal citrates, ammonium citrates, alkali metal pyrophosphates, and ammonium pyrophosphates,
    (e) the amount of said salt being within the range of 0.5–5% based on the weight of the barium sulfate.

3. A pulverulent free-flowing composition practically free of water and comprising in combination:
    (a) a nutrient component consisting of a combination of liquid fat, protein and carbohydrate, and;
    (b) pulverulent barium sulfate,
    (c) the particles of said barium sulfate being coated with a neutral therapeutically acceptable salt,
    (d) said salt being selected from the group consisting of alkali metal citrates, ammonium citrates, alkali metal pyrophosphates, and ammonium pyrophosphates.

4. A pulverulent free-flowing composition practically free of water and comprising in combination:
    (a) a nutrient component consisting of a combination of liquid fat, protein and carbohydrates, and,
    (b) pulverulent barium sulfate,
    (c) the particles of said barium sulfate being coated with tri-sodium citrate.

5. A pulverulent free-flowing composition practically free of water and comprising in combination:
    (a) a nutrient component consisting of a combination of liquid fat, protein and carbohydrates, and,
    (b) pulverulent barium sulfate,
    (c) the particles of said barium sulfate being coated with tetrapotassium pyrophosphate.

6. The method which comprises:
    (a) admixing pulverulent barium sulfate with a salt, in aqueous solution,
    (b) said salt being selected from the group consisting of alkali metal citrates, ammonium citrates, alkali metal pyrophosphates and ammonium pyrophosphates,
    (c) subjecting said aqueous solution of barium sulfate and said salt to a drying step to remove practically all of said water, and
    (d) recovering a pulverulent free flowing mass of barium sulfate, the particles of said barium sulfate being covered with a layer of said salt.

7. The method which comprises:
    (a) admixing pulverulent barium sulfate with a salt, in aqueous solution,
    (b) said salt being selected from the group consisting of alkali metal citrates, ammonium citrates, alkali metal pyrophosphates and ammonium pyrophosphates,
    (c) subjecting said aqueous solution of barium sulfate and said salt to a drying step to remove practically all of said water, and
    (d) recovering a pulverulent free flowing mass of barium sulfate, the particles of said barium sulfate being covered with a layer of said salt.
    (e) admixing said mass with a nutrient component comprising a combination of liquid fat, proteins and carbohydrates,
    (f) the liquid fat being added as the last ingredient.

8. The method which comprises:
    (a) admixing pulverulent barium sulfate with a salt, in aqueous solution,
    (b) said salt being selected from the group consisting of alkali metal citrates, ammonium citrates, alkali metal pyrophosphates and ammonium pyrophosphates,
    (c) subjecting said aqueous solution of barium sulfate and said salt to a drying step to remove practically all of said water, and
    (d) recovering a pulverulent free flowing mass of barium sulfate, the particles of said barium sulfate being covered with a layer of said salt.

(e) admixing said mass with a nutrient component comprising a combination of liquid fat, proteins, and carbohydrates.

References Cited by the Examiner

Chemical Abstracts, vol. 45, entry 5730 c, 1951 citing Gengou, Ann. Inst, Pasteur, vol. 79, pages 628–639, 1950.

Chemical Abstracts, vol. 52, entry 4286 h, 1958 citing Miara et al., J. Sci. Hiroshima Univ., ser. A 21, pages 45–48, 1957.

Chemical Abstracts, vol. 55, entry 25427 i. 1961, citing Morimoto, Nippon Kagaku Zasshi, vol. 81, pages 236–41, 1960.

LEWIS GOTTS, *Primary Examiner.*

FRANK CACCIAPAGLIA, JR., JULIAN S. LEVITT,
*Examiners.*